H. PENOYER.
Bee-Hive.

No. 165,501.  Patented July 13, 1875.

WITNESSES:
E. Wolff
A. F. Terry

INVENTOR:
H. Penoyer
BY
ATTORNEYS.

UNITED STATES PATENT OFFICE.

HIRAM PENOYER, OF ANNA, ILLINOIS.

IMPROVEMENT IN BEE-HIVES.

Specification forming part of Letters Patent No. 165,501, dated July 13, 1875; application filed April 24, 1875.

*To all whom it may concern:*

Figure 1:
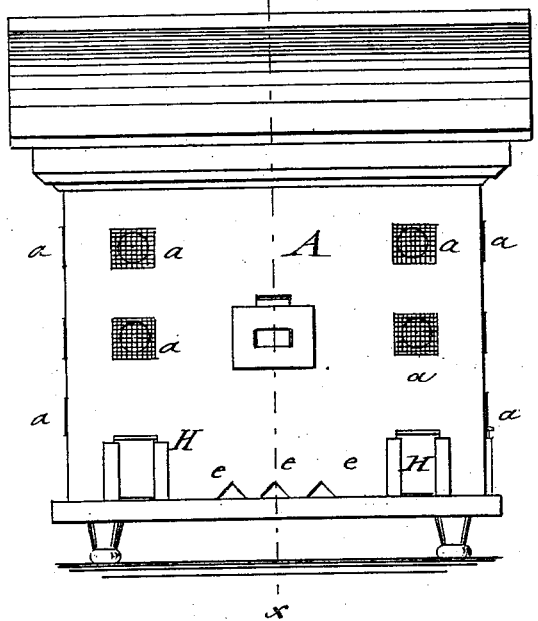
Figure 2:
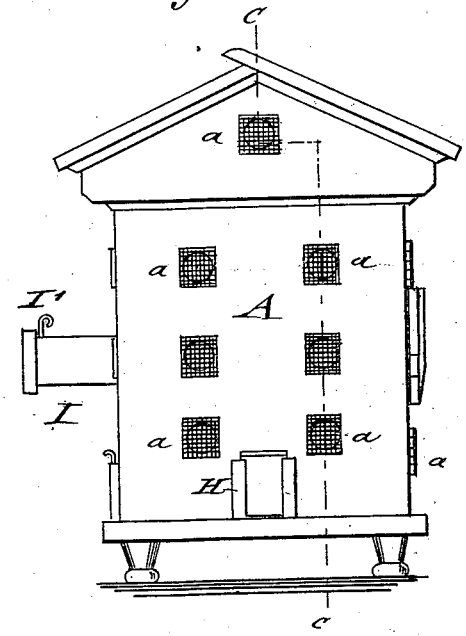
Figure 3:
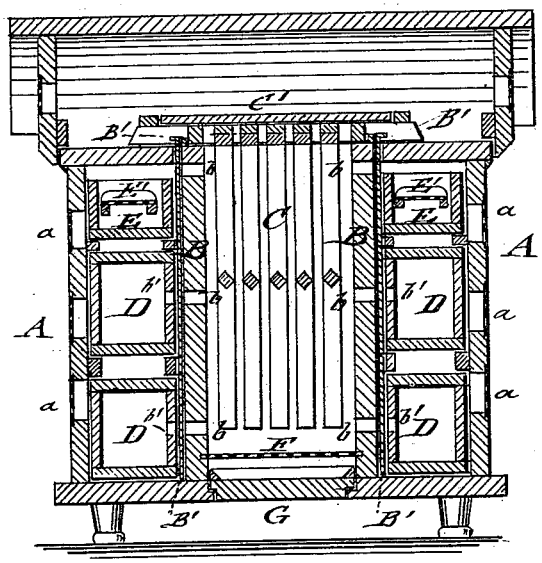
Figure 4:
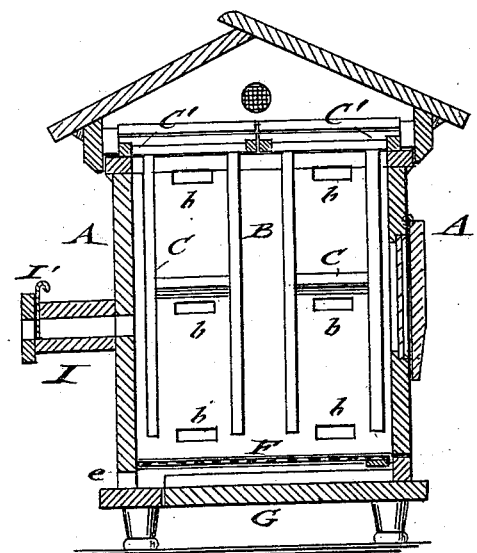

Be it known that I, HIRAM PENOYER, of Anna, in the county of Union and State of Illinois, have invented a new and Improved Bee-Hive, of which the following is a specification:

In the accompanying drawing, Figure 1 represents a front elevation; Fig. 2, a side elevation; Fig. 3, a vertical longitudinal section on the line $c\,c$, Fig. 2; and Fig. 4, a vertical transverse section on the line $x\,x$, Fig. 1, of my improved bee-hive.

Similar letters of reference indicate corresponding parts.

The invention will first be fully described, and then pointed out in the claim.

In the drawing, A represents the main frame or box of the bee-hive, which is made with a detachable ventilated roof or cover, and placed on legs, to admit the passage of air around every part of the hive, and prevent the harboring of insects at the bottom. The hive A is divided, by lateral partition-walls B, into a central and two side chambers, which are thoroughly ventilated by a series of side and front apertures, $a$, covered by wire-gauze or reticulated sheet metal, for the purpose of supplying the bees continually with pure and wholesome air, and conducting any moisture to the outside, preventing thereby freezing or other injury to the bees in the winter season.

Two separate and detachable frame-sections, C, are hung into the central chamber from top frames C′, a sufficient space being provided between the sections for the passage of the air. Each section may be taken out separately, and thereby the swarming of the bees prevented by replacing the full section with an empty one.

The central chamber communicates by slotted apertures $b$, which are placed vertically in line above each other with the side chambers, in each of which two or more detachable honey-boxes, D, and a top feed-box, E, are arranged. Side slots $b'$ of the honey-boxes correspond with the slots $b$ of the partition-walls, to admit the bees readily from the frame-sections to the honey-boxes. The upper slots $b$ give the bees access to the upper feed-boxes E, of which one contains feed, the other water, floating platforms E′ of light reticulated sheet metal or gauze swimming therein, to allow any number of bees to alight thereon without soiling themselves with feed and wasting the same or getting wet.

The side chambers may be closed off from the main chamber by metallic slide-strips B′, which are inserted for the purpose of killing the moths or other insects in the frame-sections by fumigation. The slide-strips B′ close all the slots $b$ of partitions B, and confine the bees in the side chambers of the hive after the honey and feed boxes have been removed by opening the hinged doors at the back of the hive. The doors are closed, and also the entrance to the hive, smoke being then admitted to the central chamber through the perforated bottom of the same. The bees are forced to enter the side chambers to gain the ventilation-opening, and are, when all have left the main chamber, which is seen through a window at the back, shut up by inserting the slide-strips. The main chamber may then be closely examined for moths, &c., without danger from the bees.

The perforated bottom F of the main chamber slides in side grooves independently of the litter-drawer G at some distance above the same. This allows the removing of the litter-drawer for examining and removing the moth-eggs, without allowing the bees to escape and expose the apiarian to the whole swarm. Holes $e$ at the front part of the hive admit the moths to pass into the litter-drawer without passing up through the perforated bottom.

By the removal and cleaning of the litter-drawer the eggs of the moths are readily killed, and the danger to the bees by the breeding of moths and other insects reduced to a considerable extent. Dark closets at both sides of the holes $e$, and at both sides of the hive, with slightly-opened slides, ensnare the moths by having the walls rubbed with comb or beeswax, for depositing and hatching their eggs, which may be taken out at the same time when the litter-drawer is cleaned, the closets forming thus very valuable trap devices for the protection of the bees.

A front tube, I, extends to suitable length at the front and center of the hive for the ingress and egress of the bees, the moths being prevented from entering by means of a rim of tin, zinc, sheet-iron, or wood nailed to the outer end of the tube, so that they cannot pass to the inside of the tube. A slide, I', serves to close entirely the hive for smoking it, or for keeping out robber-bees, the moths being furthermore kept from entering by the guard-bees at the inside aperture of the entrance-tube.

This improved hive offers greater facilities for protecting the bees against enemies, provides them with wholesome air and feed without danger to the attendant, regulating the swarming and the multiplication of hives, and enabling the bees to enter the spring season by closing the hive late in the fall and placing it in a warm place in a strong and lively condition, so that the yield of the hives is considerably increased, and a greater profit realized therefrom.

Having thus described my invention, I claim as new and desire to secure by Letters Patent—

A bee-hive having detachable frame-sections C, hung in central chamber from a top frame, C', movable, as and for the purpose specified.

HIRAM PENOYER.

Witnesses:
JAMES A. C. ALLEN,
JOHN B. MILLER.